United States Patent [19]

Brandon et al.

[11] Patent Number: 4,725,036
[45] Date of Patent: Feb. 16, 1988

[54] SNOW MOLDING APPARATUS

[76] Inventors: Lee P. Brandon, 1508 Hobart Pl., Apartment B, High Point, N.C. 27260; Ronald D. Breault, 323 K Montrose Dr., Greensboro, N.C. 27407

[21] Appl. No.: 825,638

[22] Filed: Feb. 3, 1986

[51] Int. Cl.$^4$ ............................................. B29C 33/20
[52] U.S. Cl. ....................................... 249/164; 249/55; 249/170; 249/219 R
[58] Field of Search ................. 249/55, 140, 160, 163, 249/164, 167, 170, 219 R, 139

[56] References Cited

U.S. PATENT DOCUMENTS

| | | | |
|---|---|---|---|
| D. 177,372 | 4/1956 | Fricke | D44/8 |
| D. 209,157 | 11/1967 | Levin | D44/1 |
| 2,198,634 | 4/1940 | Richter | 249/170 |
| 2,380,751 | 7/1945 | Gowland | 249/170 |
| 2,831,231 | 4/1958 | Toensing | 249/170 |
| 2,939,299 | 6/1960 | Sherbloom | 249/55 |
| 3,059,279 | 10/1962 | Rossi | 249/55 |
| 3,276,398 | 10/1966 | Lampros et al. | 249/170 |
| 3,309,738 | 3/1967 | Friedman | 249/164 |
| 3,393,890 | 7/1968 | Lemelson | 249/55 |
| 3,788,590 | 1/1974 | Hasselbach | 249/164 |
| 3,815,851 | 6/1974 | Girard | 249/163 |
| 3,881,682 | 5/1975 | Kin | 249/164 |
| 3,897,931 | 8/1975 | Hake | 249/164 |
| 4,164,341 | 8/1979 | McComb | 249/163 |

FOREIGN PATENT DOCUMENTS

| | | | |
|---|---|---|---|
| 744165 | 2/1956 | United Kingdom | 249/164 |
| 2050234A | 1/1981 | United Kingdom | 249/163 |

Primary Examiner—Jay H. Woo
Assistant Examiner—James C. Housel

[57] ABSTRACT

Apparatus for molding statues or other objects of natural snow or other low pressure fusible materials includes front and rear mold sections which are slidably positioned with frames and a removable mold support is engagable with said frames. The mold sections are brought into cooperative engagement allowing the contained snow in each section to fuse into a unitary object after being packed with snow. The assembled sections are then uprighted and upon removal of the mold support the mold sections descend within their frames to rest on the ground where upon arcuate removal of the mold sections and frames provides a free standing snow figure or statue.

9 Claims, 9 Drawing Figures

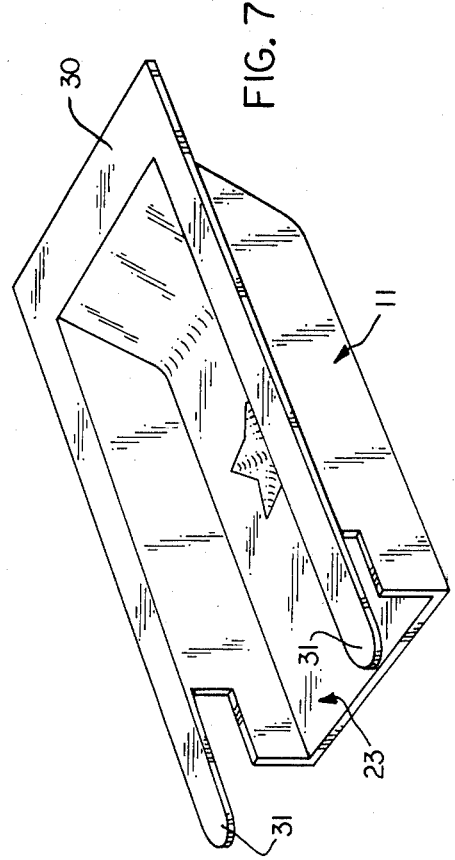
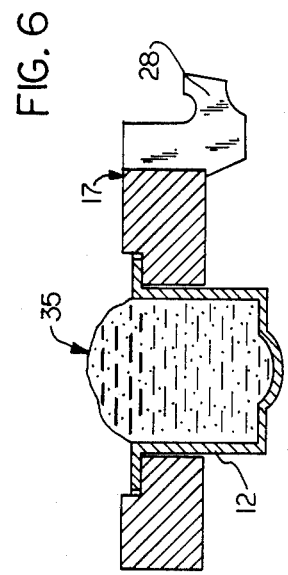
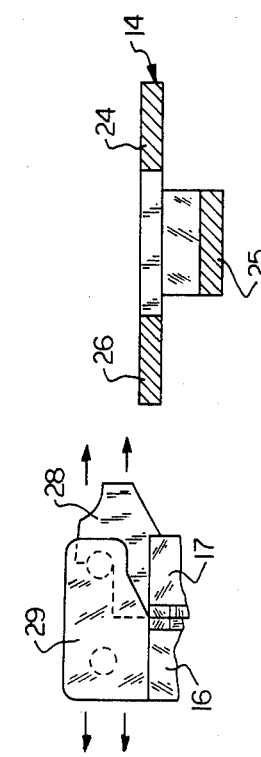
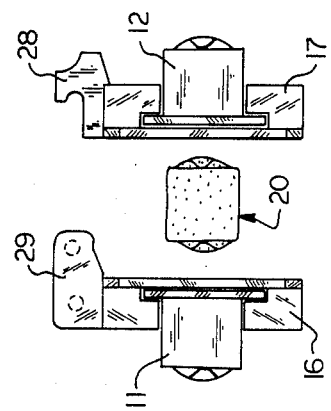
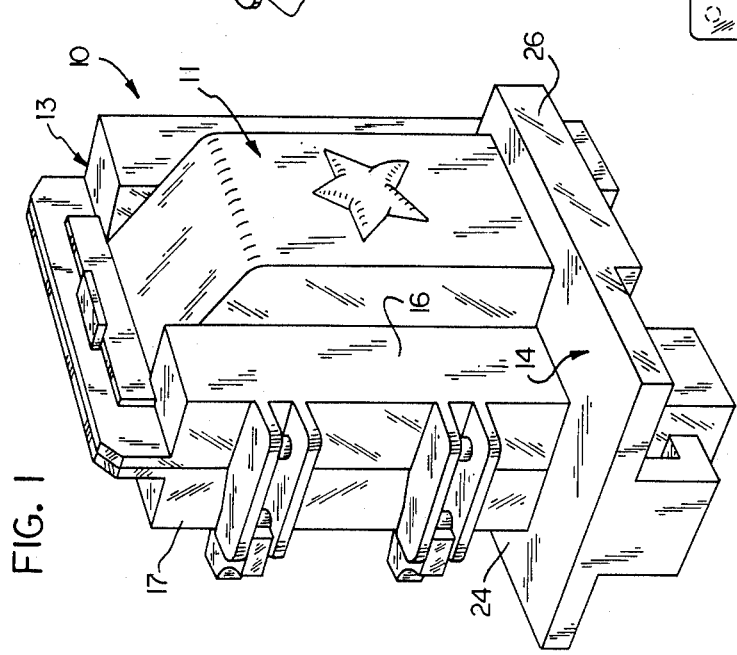
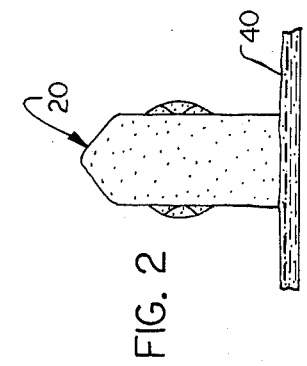

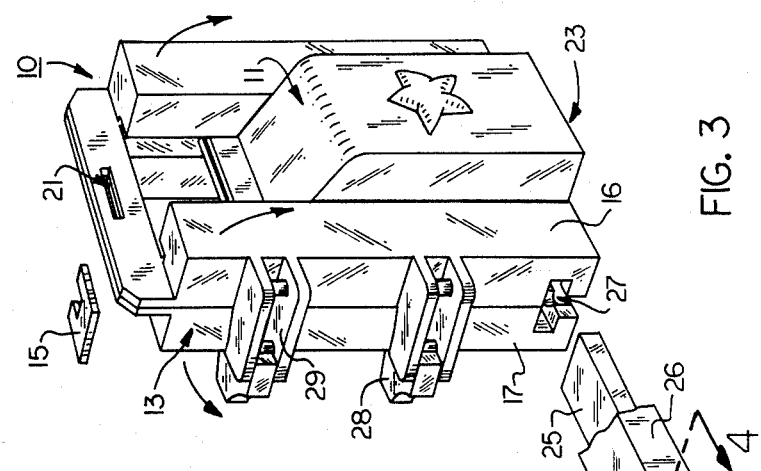
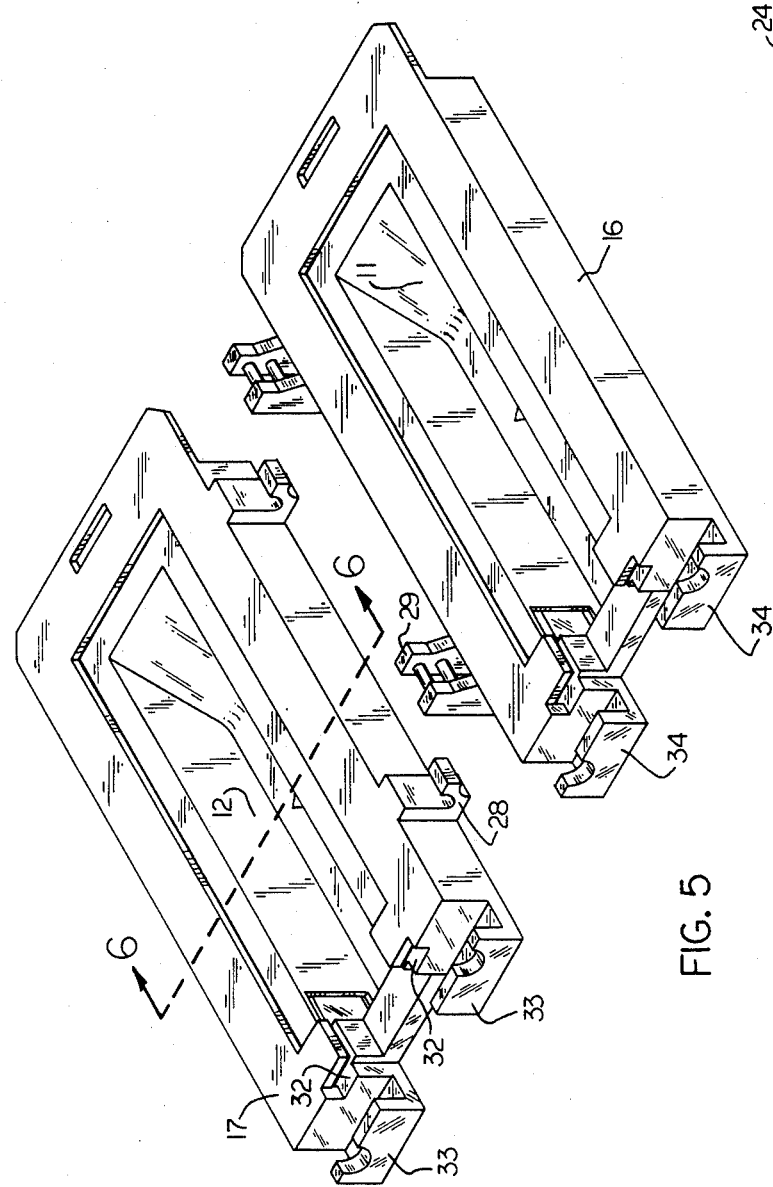

SNOW MOLDING APPARATUS

BACKGROUND OF THE INVENTION

1. Field Of The Invention

The present invention relates to a mold for forming small statues or the like and particularly for forming outdoor statues of natural snow.

2. Description Of The Prior Art And Objectives Of The Invention

Children and adults through the years have built statues such as snowmen from natural snow by hand packing and shaping to desired sizes and configurations. Pans, pots and other containers have been utilized to carry and mold the snow but exact sizes and forms for snow statues have been very difficult to duplicate and maintain. Also, due to the hand operation required in building most snow objects, statues of snow are usually built with a great degree of inconvenience and discomfort, particularly for young children and during extreme cold.

With the disadvantages known in the conventional building of snow statue the present invention was conceived and one of its objectives is to provide a process for easily forming a moldable material such as snow into a desired shape.

It is another objective of the present invention to provide a pair of mold sections within frames which are cooperatively engagable for forming an object of snow.

It is still another objective of the present invention to provide an apparatus for molding snow which includes replaceable mold sections having different outer configurations so that a wide variety of shapes can be formed.

It is still yet another objective of the present invention to provide an apparatus for molding snow to desired shapes which includes a mold section, a frame for receiving said mold section and a mold support which will engage and disengage from said frame.

Other objectives and advantages of the apparatus and process for molding snow into desired shapes will become apparent to those skilled in the art as a more detailed description of the invention is set forth below.

SUMMARY OF THE INVENTION

The present invention consists of an apparatus and method for forming moldable materials into desired shapes by using two mold sections which may be formed from plastics such as polyethylene, polyurethane, polycarbonates or other plastics or metals such as aluminum. The mold sections are slidably received in substantially rigid mold frames and are movable within said frames. A frame support is provided which, after bringing the mold sections together, engages said mold frames and supports the mold sections vertically. The mold support can thereafter be disengaged from the joined frames and mold sections, thereby allowing the mold sections to descend within said frames onto the base or ground below. Thereafter the frames are arcuately separated from the snow statue or object so the statue is positioned on the ground as the mold sections have open bottom ends.

BRIEF DESCRIPTION OF THE DRAWINGS

FIG. 1 illustrates in perspective fashion the apparatus of the invention in assembled form;

FIG. 2 demonstrates a side elevational view of the object as would be formed within apparatus of FIG. 1;

FIG. 3 shows in perspective fashion the apparatus of FIG. 1 with mold support and locking means removed and with the mold sections in descended posture;

FIG. 4 depicts a cross sectional view of the mold support along lines 4—4;

FIG. 5 illustrates front and rear mold sections each within their respective frames prior to engagement;

FIG. 6 shows an end view of the rear mold section along lines 6—6 of FIG. 5 containing snow;

FIG. 7 demonstrates one mold section removed from its frame;

FIG. 8 demonstrates the hinge assembly with the molds and frames in an assembled or engaged posture; and FIG. 9 shows a top view of the removed object and mold sections within their respective frames.

DESCRIPTION OF THE PREFERRED EMBODIMENT

The preferred apparatus of the invention is demonstrated in FIGS. 1 through 5 in which mold sections and other components are formed from a high density polyethlene having a high flex and fatigue resistance with a brittle temperature of from $-75°$ to $-100°$ F. The mold sections are somewhat trough-like with open bottom ends and are manufactured having desired outer configurations to form objects or statues which may be of approximately 4 feet in height and 18 inches in thickness, formed from natural snow. The process for using the apparatus of the invention comprises sliding front and rear mold sections into respective frames then the mold frames containing the mold sections are hingably engaged. The mold sections are then filled with snow and one frame with its mold section is rotated approximately 180° into cooperative engagement with the other. The snow contained within the mold section is compacted and fused to form a unitary object. With the frames so positioned the mold support is then slid into place along the lower portion of the frames and thereafter the upper sections of the frames are secured by locking means. The assembled unit is then lifted into an upright position. Next, the mold support is slidably removed from the engaged frame whereupon the mold sections descend to the ground below while remaining within their respective frames. This places the open end of each mold section on the ground and allows the flange points of the mold sections to penetrate into the ground. The locking means is removed and the frame members with their respective mold sections are oppositely rotated apart without interference with the hinge members in arcuate fashion away from the object which now stands on the ground whereupon the object is then available for further decoration, observation or the like. The mold sections can thereafter be filled with snow again and the process repeated.

Natural snow is the preferred moldable material for use with the apparatus as shown herein although other materials, natural or synthetic may also be used provided they will adhere or fuse under relatively low pressure.

DETAILED DESCRIPTION OF THE DRAWINGS

A moldable material such as natural snow which can be fused by relatively low pressure can be formed and positioned on the ground or some other base by utilizing apparatus 10 as shown in FIG. 1. Apparatus 10 includes front mold section 11 and rear mold section 12 (not shown in FIG. 1). Mold sections 11 and 12 are slidably positioned within mold frame 13 and are supported at their bottom open ends by mold support 14. Mold frame 13 is formed from right frame section 16 and left frame section 17. As would be understood various designs can be incorporated into mold sections 11 and 12 such as animal or human features, geometrical designs or otherwise and a variety of interchangable mold sections 11 and 12 can be designed and provided as required. Front mold section 11 and rear mold section 12 may employ complimentary or entirely different designs as desired.

Mold apparatus 10 is shown in FIG. 3 with locking means 15 removed from slot 21 and with mold support 14 withdrawn from frame 13. Front mold section 11 and rear mold section 12 (not shown) have descended and frame sections 16 and 17 with mold sections 11 and 12 are now available for removal from the object or statue contained therein. To free said object, the upper portion of frame sections 16 and 17 are grasped and pulled downwardly in arcuate fashion as shown by the arrows in FIG. 3 so object 20 as contained therein (FIG. 2) will not be damaged. As further shown in FIG. 3 front mold section 11 has a sloped upper portion of 15° or more so during the arcuate removal the upper portion of the object is not damaged as the mold passes thereover. Lower end 23 of mold sections 11 and 12 are open as shown in FIG. 7 whereby the object will then rest on the ground or other suitable base once mold support 14 is removed therefrom and mold sections 11 and 12 descend within their respective frames.

As shown in FIGS. 3 and 4 mold support 14 includes a trio of frame engaging fingers including left frame engaging finger 24, center engaging finger 25 and right frame engaging finger 26. Left finger 24 and right finger 26 surround frame 13 as shown in FIG. 1 and respectively support or form a rest for mold sections 12 and 11. Center finger 25 as shown in FIG. 3 enters support slot 27 and acts as a runner or slide during removal of mold support 14. Frame sections 16 and 17, mold support 14 and mold sections 11 and 12 may be all formed from suitable plastics or metals or combinations thereof or possibly other materials such as suitably treated fabrics or wood and the exact compositions or structures may be varied, modified or combined depending upon the cost, availability or particular object or moldable material which is to be employed.

FIG. 5 demonstrates an inside view of front mold section 11 slidably received within frame section 16 and rear mold section 12 within left frame section 17. Left hinge members 28 and right hinge members 29 allow for the mold sections, to be joined, filled with snow and conveniently closed or engaged in proper alignment. Hinge members 28 and 29 are constructed whereby flush engagement between right frame section 16 and left frame section 17 will not prevent one frame section from being arcuately separated from the other as earlier described. FIG. 8 demonstrates the alignments of hinge members 28 and 29 and frame sections 16 and 17 in a flush engagement demonstrating by arrows the separation thereof.

FIG. 7 illustrates mold section 11 removed from right frame section 16 with flange 30 and lower flange points 31 which are used to stabilize mold section 11 once mold support 14 has been removed and mold sections 11 and 12 descend onto the ground or some other base such as a packed snow base. In FIG. 5 lower flange points 31 which are positioned on both mold sections 11 and 12 are not visible but upon descent flange points 31 extend through flange slots 32 for penetration into the ground or snow below. As would also be understood from FIG. 5, support slot 27 as seen in FIG. 3 is formed from left frame slot housing 33 and right frame slot housing 34.

FIG. 6 depicts in cross sectional view along line 6—6 of FIG. 5 mold section 12 within frame section 17 and also illustrates an abundance of natural snow 35 as may be placed within mold section 12. It should be noted that an abundance of snow 35 is placed in both mold sections so that upon engagement of front mold section 11 and rear mold section 12 that the excess snow will be compressed and thereby fused to form an object with sufficient integrity to withstand wind and moderate temperature changes.

The process of using apparatus 10 as hereinbefore explained consists of hingedly engaging front mold section 11 which has been slidably positioned with its frame section 16 with rear mold section 12 positioned within frame section 17 and thereafter the mold sections are filled with an excess of snow where upon said mold sections within their respective frames are rotated one on top of the other so as to position left frame section 17 and right frame section 16 into vertical, flush cooperative engagement. Thereafter locking means 15 is securely positioned within slot 21 as shown in FIG. 3. Next, mold support 14 as seen in FIG. 4 is slid onto frame sections 16 and 17 with front mold section 11 and rear mold section 12 being in an upward or raised posture. Thereafter, apparatus 10 is lifted and positioned in an upright manner to rest on the bottom of center finger 25 of mold support 14.

Mold apparatus 10 may then be moved to a desired position in the yard, for example near a sidewalk for passing observers to easily view. When properly located, mold support 14 is slidably removed from frame sections 16 and 17 whereupon front mold section 11 and rear mold section 12 having open bottom ends slidably descend within frame sections 16 and 17 whereby lower flange points 31 penetrate the ground or snow base. With the frame sections in the lowered or descended posture locking means 15 is removed from slot 21 and thereafter frame sections 16 and 17 are separated at the top and are arcuately removed from top to bottom where upon the object contained therein then stands free on the ground or snow base 40 (FIG. 2).

The mold sections are then available for forming other objects or said mold sections can be removed and other sections having different designs thereon can be slidably positioned within the respective frame sections to form other statues or objects.

Modifications and changes can be made to the apparatus and process as described herein and the examples and illustrations are for illustrative purposes and are not intended to limit the scope of the appended claims.

We claim:

1. Apparatus for forming moldable materials into desired shapes comprising: a pair of mold sections for receiving a moldable material, said mold sections each including a trough having an open end, a pair of separable frame sections, said frame sections each receiving one of said mold sections, said mold sections moveable within said frame sections from a raised to a lowered position, said mold sections within said frame sections being engagable with each other so the moldable material in one of said mold sections contacts the moldable material in the other of said mold sections to fuse therewith, said frame sections cooperatively forming a support slot adjacent said open ends, a mold support, said mold support being insertable into said support slot for supporting said mold sections in said frame sections in the raised position, said mold support further having means for covering said open ends and securing said frame sections in an engaged posture whereby when said mold support disengages said support slot said mold sections can move downwardly within said frame sections to a base below.

2. Apparatus as claimed in claim 1 wherein each mold section includes a flange point, said flange point attached to said trough and extending beyond the open end of said trough.

3. Apparatus as claimed in claim 1 wherein said trough includes a surrounding flange.

4. Apparatus as claimed in claim 3 wherein each frame section includes a slot for receiving a respective flange.

5. Apparatus as claimed in claim 1 wherein said frame sections each include a portion of a hinge member, said hinge member for rotating said frame sections into engagement with each other.

6. Apparatus as claimed in claim 1 wherein said frame sections further include locking means, said locking means securing said frame sections to each other.

7. Apparatus as claimed in claim 1 wherein said mold support engages both frame sections.

8. Apparatus as claimed in claim 1 wherein said mold support includes a trio of parallel frame engaging fingers, one of said fingers for entering said support slot.

9. Apparatus as claimed in 1 wherein said trio of engaging fingers includes a middle frame engaging finger for entering said support slot.

* * * * *